(12) United States Patent
Minnick et al.

(10) Patent No.: US 9,100,614 B2
(45) Date of Patent: Aug. 4, 2015

(54) GRAPHICAL INTERFACE NAVIGATION BASED ON IMAGE ELEMENT PROXIMITY

(75) Inventors: Danny Jean Minnick, Littleton, CO (US); Michael T. Steinert, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 636 days.

(21) Appl. No.: 12/609,860

(22) Filed: Oct. 30, 2009

(65) Prior Publication Data

US 2010/0115550 A1    May 6, 2010

Related U.S. Application Data

(60) Provisional application No. 61/110,233, filed on Oct. 31, 2008.

(51) Int. Cl.
*H04N 21/422* (2011.01)
*H04N 5/44* (2011.01)
*G06F 3/0485* (2013.01)

(52) U.S. Cl.
CPC ............ *H04N 5/4403* (2013.01); *G06F 3/0485* (2013.01); *H04N 21/42206* (2013.01); *H04N 21/42224* (2013.01); *H04N 2005/443* (2013.01); *H04N 2005/4417* (2013.01)

(58) Field of Classification Search
CPC .. G06F 3/04817; G06F 3/0482; G06F 3/0488
USPC ............ 725/37; 715/716, 835, 839; 345/440; 4/37
See application file for complete search history.

(56) References Cited

U.S. PATENT DOCUMENTS

| | | | |
|---|---|---|---|
| 4,450,477 A | | 5/1984 | Lovett |
| 4,725,888 A | | 2/1988 | Hakamada |
| 4,739,150 A | | 4/1988 | Jeffers et al. |
| 4,739,510 A | | 4/1988 | Jeffers et al. |
| 4,852,019 A | * | 7/1989 | Vinberg et al. ............... 345/440 |
| 4,868,785 A | * | 9/1989 | Jordan et al. .................. 345/440 |
| 5,187,776 A | | 2/1993 | Yanker |
| 5,260,778 A | | 11/1993 | Kauffman et al. |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

USPTO "Non-Final Office Action" mailed Dec. 6, 2011; U.S. Appl. No. 12/241,580, filed Sep. 30, 2008.

(Continued)

*Primary Examiner* — Steven Sax
*Assistant Examiner* — David Choi
(74) *Attorney, Agent, or Firm* — Ingrassia Fisher & Lorenz, P.C.

(57) ABSTRACT

A method of facilitating navigation of a graphical user interface is presented. In the method, an image associated with the graphical user interface is generated for presentation to a user. The image includes a plurality of image elements, wherein the image elements collectively occupy less than the entirety of the image. An input indicating a location not coinciding with at least one of the image elements is received. One of the image elements is selected based upon the proximity of the location with the one of the image elements.

18 Claims, 9 Drawing Sheets

(56) References Cited

U.S. PATENT DOCUMENTS

| | | | |
|---|---|---|---|
| 5,428,734 A * | 6/1995 | Haynes et al. | 715/769 |
| 5,438,372 A | 8/1995 | Tsumori et al. | |
| 5,450,536 A | 9/1995 | Rosenberg et al. | |
| 5,453,796 A | 9/1995 | Duffield et al. | |
| 5,539,478 A | 7/1996 | Bertram et al. | |
| 5,539,479 A | 7/1996 | Bertram | |
| 5,545,857 A | 8/1996 | Lee et al. | |
| 5,548,340 A | 8/1996 | Bertram | |
| 5,559,961 A | 9/1996 | Blonder | |
| 5,585,866 A | 12/1996 | Miller et al. | |
| 5,589,893 A | 12/1996 | Gaughan et al. | |
| 5,594,469 A | 1/1997 | Freeman et al. | |
| 5,594,509 A | 1/1997 | Florin et al. | |
| 5,602,597 A | 2/1997 | Bertram | |
| 5,604,544 A | 2/1997 | Bertram | |
| 5,606,374 A | 2/1997 | Bertram | |
| 5,650,827 A | 7/1997 | Tsumori et al. | |
| 5,652,630 A | 7/1997 | Bertram et al. | |
| 5,659,369 A | 8/1997 | Imaiida | |
| 5,677,708 A | 10/1997 | Matthews, III et al. | |
| 5,682,489 A * | 10/1997 | Harrow et al. | 715/839 |
| 5,721,815 A | 2/1998 | Ottesen et al. | |
| 5,721,878 A | 2/1998 | Ottesen et al. | |
| 5,742,286 A * | 4/1998 | Kung et al. | 715/839 |
| 5,751,883 A | 5/1998 | Ottesen et al. | |
| 5,754,258 A | 5/1998 | Hanaya et al. | |
| 5,757,358 A * | 5/1998 | Osga | 715/862 |
| 5,767,840 A * | 6/1998 | Selker | 345/161 |
| 5,768,158 A * | 6/1998 | Adler et al. | 715/209 |
| 5,774,186 A | 6/1998 | Brodsky et al. | |
| 5,786,805 A * | 7/1998 | Barry | 345/159 |
| 5,801,747 A | 9/1998 | Bedard | |
| 5,805,235 A | 9/1998 | Bedard | |
| 5,808,601 A * | 9/1998 | Leah et al. | 715/856 |
| 5,809,265 A * | 9/1998 | Blair et al. | 715/764 |
| 5,815,216 A | 9/1998 | Suh | |
| 5,825,361 A * | 10/1998 | Rubin et al. | 715/839 |
| 5,831,591 A | 11/1998 | Suh | |
| 5,831,607 A * | 11/1998 | Brooks | 715/746 |
| 5,867,162 A * | 2/1999 | O'Leary et al. | 715/843 |
| 5,874,953 A * | 2/1999 | Webster et al. | 715/733 |
| 5,898,431 A * | 4/1999 | Webster et al. | 715/841 |
| 5,905,496 A * | 5/1999 | Lau et al. | 715/835 |
| 5,917,488 A * | 6/1999 | Anderson et al. | 715/838 |
| 5,917,489 A * | 6/1999 | Thurlow et al. | 715/809 |
| 5,936,623 A * | 8/1999 | Amro | 715/835 |
| 5,949,417 A * | 9/1999 | Calder | 715/788 |
| 5,956,025 A * | 9/1999 | Goulden et al. | 715/716 |
| 5,966,121 A * | 10/1999 | Hubbell et al. | 715/726 |
| 5,978,043 A | 11/1999 | Blonstein et al. | |
| 5,999,228 A | 12/1999 | Matsuura et al. | |
| 6,005,565 A | 12/1999 | Legall | |
| 6,008,735 A | 12/1999 | Chiloyan et al. | |
| 6,008,860 A | 12/1999 | Patton et al. | |
| 6,018,342 A * | 1/2000 | Bristor | 715/840 |
| 6,020,930 A | 2/2000 | Legrand | |
| 6,052,121 A * | 4/2000 | Webster et al. | 715/733 |
| 6,057,841 A * | 5/2000 | Thurlow et al. | 715/809 |
| 6,064,376 A | 5/2000 | Berezowski et al. | |
| 6,078,308 A * | 6/2000 | Rosenberg et al. | 715/856 |
| 6,088,029 A * | 7/2000 | Guiberson et al. | 715/808 |
| 6,118,442 A * | 9/2000 | Tanigawa | 715/719 |
| 6,118,498 A | 9/2000 | Reitmeier | |
| 6,125,374 A * | 9/2000 | Terry et al. | 715/234 |
| 6,141,003 A | 10/2000 | Chor et al. | |
| 6,147,714 A | 11/2000 | Terasawa et al. | |
| 6,173,112 B1 | 1/2001 | Gruse et al. | |
| 6,191,773 B1 | 2/2001 | Maruno et al. | |
| 6,208,341 B1 * | 3/2001 | van Ee et al. | 715/716 |
| 6,208,804 B1 | 3/2001 | Ottesen et al. | |
| 6,215,417 B1 | 4/2001 | Krass et al. | |
| 6,233,389 B1 | 5/2001 | Barton et al. | |
| 6,266,098 B1 | 7/2001 | Cove et al. | |
| 6,281,940 B1 | 8/2001 | Scimmarella | |
| 6,334,217 B1 | 12/2001 | Kim | |
| 6,362,842 B1 * | 3/2002 | Tahara et al. | 715/856 |
| 6,493,036 B1 | 12/2002 | Fernandez | |
| 6,498,628 B2 | 12/2002 | Iwamura | |
| 6,526,577 B1 | 2/2003 | Knudson et al. | |
| 6,529,685 B2 | 3/2003 | Ottesen et al. | |
| 6,556,252 B1 | 4/2003 | Kim | |
| 6,567,109 B1 * | 5/2003 | Todd | 715/862 |
| 6,650,248 B1 | 11/2003 | O'Donnell et al. | |
| 6,678,009 B2 | 1/2004 | Kahn | |
| 6,697,123 B2 | 2/2004 | Janevski et al. | |
| 6,750,803 B2 | 6/2004 | Yates et al. | |
| 6,750,887 B1 | 6/2004 | Kellerman et al. | |
| 6,774,914 B1 | 8/2004 | Benayoun | |
| 6,804,824 B1 | 10/2004 | Potrebic et al. | |
| 6,816,442 B1 | 11/2004 | Heiman et al. | |
| 6,822,698 B2 | 11/2004 | Clapper | |
| 6,882,712 B1 | 4/2005 | Iggulden et al. | |
| 6,934,963 B1 | 8/2005 | Reynolds et al. | |
| 6,943,845 B2 | 9/2005 | Mizutome et al. | |
| 7,046,161 B2 | 5/2006 | Hayes | |
| 7,061,544 B1 | 6/2006 | Nonomura et al. | |
| 7,148,909 B2 | 12/2006 | Yui et al. | |
| 7,171,622 B2 | 1/2007 | Bhogal | |
| 7,196,733 B2 | 3/2007 | Aratani et al. | |
| 7,206,029 B2 | 4/2007 | Cohen-Solal | |
| 7,225,456 B2 | 5/2007 | Kitsukawa et al. | |
| 7,231,603 B2 | 6/2007 | Matsumoto | |
| 7,268,830 B2 | 9/2007 | Lee | |
| 7,370,284 B2 | 5/2008 | Andrea et al. | |
| 7,420,620 B2 | 9/2008 | Habas et al. | |
| 7,434,246 B2 | 10/2008 | Florence | |
| 7,440,036 B2 | 10/2008 | Onomatsu et al. | |
| 7,584,492 B2 | 9/2009 | Terakado et al. | |
| 7,600,201 B2 * | 10/2009 | Endler et al. | 715/863 |
| 7,620,966 B2 | 11/2009 | Kitamori | |
| 7,636,131 B2 | 12/2009 | Hsieh et al. | |
| 7,707,599 B1 | 4/2010 | Groff et al. | |
| 7,746,332 B2 | 6/2010 | Le Leannec et al. | |
| 7,876,382 B2 | 1/2011 | Imaizumi | |
| 7,880,813 B2 | 2/2011 | Nakamura et al. | |
| 7,958,460 B2 * | 6/2011 | Garrison et al. | 715/812 |
| 8,001,566 B2 | 8/2011 | Jang | |
| 8,005,826 B1 | 8/2011 | Sahami et al. | |
| 8,065,705 B2 | 11/2011 | Kawai | |
| 8,239,784 B2 | 8/2012 | Hotelling et al. | |
| 2001/0011953 A1 | 8/2001 | Shintani et al. | |
| 2001/0017672 A1 | 8/2001 | Verhaeghe | |
| 2002/0054062 A1 | 5/2002 | Gerba et al. | |
| 2002/0057382 A1 | 5/2002 | Yui | |
| 2002/0059599 A1 | 5/2002 | Schein et al. | |
| 2002/0060754 A1 | 5/2002 | Takeuchi | |
| 2002/0070957 A1 | 6/2002 | Trajkovic et al. | |
| 2002/0075333 A1 * | 6/2002 | Dutta et al. | 345/862 |
| 2002/0075407 A1 | 6/2002 | Cohen-Solal | |
| 2002/0097229 A1 | 7/2002 | Rose et al. | |
| 2002/0122027 A1 | 9/2002 | Kim | |
| 2002/0122079 A1 | 9/2002 | Kamen et al. | |
| 2002/0129366 A1 | 9/2002 | Schein et al. | |
| 2002/0174430 A1 | 11/2002 | Ellis et al. | |
| 2002/0178446 A1 | 11/2002 | Sie et al. | |
| 2002/0191954 A1 | 12/2002 | Beach | |
| 2003/0001908 A1 | 1/2003 | Cohen-solal | |
| 2003/0005443 A1 | 1/2003 | Axelsson et al. | |
| 2003/0005445 A1 | 1/2003 | Schein et al. | |
| 2003/0018973 A1 | 1/2003 | Thompson | |
| 2003/0025716 A1 | 2/2003 | Colavin | |
| 2003/0066079 A1 | 4/2003 | Suga | |
| 2003/0086694 A1 | 5/2003 | Davidsson | |
| 2003/0115589 A1 | 6/2003 | D'Souza et al. | |
| 2003/0126607 A1 | 7/2003 | Phillips et al. | |
| 2003/0131356 A1 | 7/2003 | Proehl et al. | |
| 2003/0191947 A1 | 10/2003 | Stubblefield et al. | |
| 2003/0193426 A1 | 10/2003 | Vidal | |
| 2003/0208751 A1 | 11/2003 | Kim et al. | |
| 2004/0041723 A1 | 3/2004 | Shibamiya et al. | |
| 2004/0070593 A1 | 4/2004 | Neely et al. | |
| 2004/0107439 A1 | 6/2004 | Hassell et al. | |
| 2004/0111744 A1 | 6/2004 | Bae et al. | |
| 2004/0117038 A1 | 6/2004 | Karaoguz et al. | |

(56) References Cited

U.S. PATENT DOCUMENTS

| | | | |
|---|---|---|---|
| 2004/0168191 A1 | 8/2004 | Jerding et al. | |
| 2004/0172651 A1 | 9/2004 | Wasilewski et al. | |
| 2004/0201780 A1 | 10/2004 | Kim | |
| 2004/0218905 A1 | 11/2004 | Green et al. | |
| 2004/0230843 A1 | 11/2004 | Jansen | |
| 2004/0255336 A1 | 12/2004 | Logan et al. | |
| 2005/0002649 A1 | 1/2005 | Boyle et al. | |
| 2005/0010949 A1 | 1/2005 | Ward et al. | |
| 2005/0015803 A1 | 1/2005 | Macrae et al. | |
| 2005/0076361 A1 | 4/2005 | Choi et al. | |
| 2005/0084233 A1 | 4/2005 | Fujii et al. | |
| 2005/0128366 A1 | 6/2005 | Cha | |
| 2005/0188402 A1 | 8/2005 | de Andrade et al. | |
| 2005/0190280 A1 | 9/2005 | Haas et al. | |
| 2005/0235226 A1* | 10/2005 | Watanabe et al. | 715/835 |
| 2005/0251826 A1 | 11/2005 | Orr | |
| 2005/0268100 A1 | 12/2005 | Gasparini et al. | |
| 2006/0037047 A1 | 2/2006 | DeYonker et al. | |
| 2006/0051058 A1 | 3/2006 | Rudolph et al. | |
| 2006/0061668 A1 | 3/2006 | Ise | |
| 2006/0061688 A1 | 3/2006 | Choi | |
| 2006/0064700 A1 | 3/2006 | Ludvig et al. | |
| 2006/0084409 A1 | 4/2006 | Ghadiali | |
| 2006/0095401 A1 | 5/2006 | Krikorian et al. | |
| 2006/0184900 A1* | 8/2006 | Ishii et al. | 715/835 |
| 2006/0233519 A1 | 10/2006 | Narita | |
| 2006/0236342 A1 | 10/2006 | Kunkel et al. | |
| 2007/0019111 A1 | 1/2007 | Won | |
| 2007/0039019 A1 | 2/2007 | Collier | |
| 2007/0039020 A1 | 2/2007 | Cansler, Jr. et al. | |
| 2007/0061724 A1 | 3/2007 | Slothouber et al. | |
| 2007/0074254 A1 | 3/2007 | Sloo | |
| 2007/0079334 A1 | 4/2007 | Silver | |
| 2007/0115391 A1 | 5/2007 | Anderson | |
| 2007/0130607 A1 | 6/2007 | Thissen et al. | |
| 2007/0186231 A1 | 8/2007 | Haeuser et al. | |
| 2007/0192791 A1 | 8/2007 | Sullivan et al. | |
| 2007/0195197 A1 | 8/2007 | Seong et al. | |
| 2007/0199022 A1 | 8/2007 | Moshiri et al. | |
| 2007/0266397 A1 | 11/2007 | Lin | |
| 2007/0277224 A1 | 11/2007 | Osborn et al. | |
| 2008/0010518 A1 | 1/2008 | Jiang et al. | |
| 2008/0024682 A1 | 1/2008 | Chen | |
| 2008/0034314 A1 | 2/2008 | Louch et al. | |
| 2008/0052245 A1 | 2/2008 | Love | |
| 2008/0059060 A1 | 3/2008 | Irish et al. | |
| 2008/0066102 A1 | 3/2008 | Abraham et al. | |
| 2008/0074550 A1 | 3/2008 | Park | |
| 2008/0088495 A1 | 4/2008 | Kawakita | |
| 2008/0129886 A1 | 6/2008 | Ishihara | |
| 2008/0134043 A1* | 6/2008 | Georgis et al. | 715/733 |
| 2008/0147803 A1 | 6/2008 | Krzyzanowski et al. | |
| 2008/0184324 A1 | 7/2008 | Yun et al. | |
| 2008/0222523 A1* | 9/2008 | Fox et al. | 715/701 |
| 2008/0229254 A1* | 9/2008 | Warner | 715/856 |
| 2008/0231762 A1 | 9/2008 | Hardacker et al. | |
| 2008/0235735 A1 | 9/2008 | Wroblewski | |
| 2008/0263595 A1 | 10/2008 | Sumiyoshi et al. | |
| 2009/0007209 A1 | 1/2009 | Kawai | |
| 2009/0031335 A1 | 1/2009 | Hendricks et al. | |
| 2009/0031343 A1 | 1/2009 | Sharkey | |
| 2009/0070815 A1 | 3/2009 | Barrett et al. | |
| 2009/0141024 A1 | 6/2009 | Lee et al. | |
| 2009/0241145 A1 | 9/2009 | Sharma | |
| 2009/0271368 A1* | 10/2009 | Channell | 707/3 |
| 2009/0327886 A1* | 12/2009 | Whytock et al. | 715/702 |
| 2010/0037180 A1 | 2/2010 | Elias et al. | |
| 2010/0050199 A1 | 2/2010 | Kennedy | |
| 2010/0071004 A1 | 3/2010 | Wightman | |
| 2010/0074592 A1 | 3/2010 | Taxier et al. | |
| 2010/0077432 A1 | 3/2010 | VanDuyn et al. | |
| 2010/0079671 A1 | 4/2010 | VanDuyn et al. | |
| 2010/0079681 A1 | 4/2010 | Coburn et al. | |
| 2010/0083309 A1 | 4/2010 | White et al. | |
| 2010/0083310 A1 | 4/2010 | VanDuyn et al. | |
| 2010/0083312 A1 | 4/2010 | White et al. | |
| 2010/0083313 A1 | 4/2010 | White et al. | |
| 2010/0083315 A1 | 4/2010 | White et al. | |
| 2010/0083319 A1 | 4/2010 | Martch et al. | |
| 2010/0100909 A1 | 4/2010 | Arsenault et al. | |
| 2010/0115550 A1* | 5/2010 | Minnick et al. | 725/37 |
| 2010/0118211 A1 | 5/2010 | Carlsgaard et al. | |
| 2010/0169958 A1 | 7/2010 | Werner et al. | |
| 2010/0231525 A1 | 9/2010 | Chen | |
| 2010/0250336 A1* | 9/2010 | Selinger et al. | 705/10 |
| 2010/0325583 A1* | 12/2010 | Aarni et al. | 715/833 |
| 2011/0018817 A1 | 1/2011 | Kryze et al. | |
| 2011/0173068 A1* | 7/2011 | O'Hanlon | 705/14.52 |
| 2011/0320380 A1* | 12/2011 | Zahn et al. | 705/347 |
| 2012/0011530 A1* | 1/2012 | Bentolila et al. | 725/14 |
| 2012/0030135 A1* | 2/2012 | Weiss et al. | 705/347 |
| 2012/0310771 A1* | 12/2012 | Selinger et al. | 705/26.7 |
| 2013/0073979 A1* | 3/2013 | Shepherd et al. | 715/744 |
| 2013/0282486 A1* | 10/2013 | Rahle et al. | 705/14.53 |
| 2014/0053105 A1* | 2/2014 | Sakata et al. | 715/811 |

FOREIGN PATENT DOCUMENTS

| | | | | |
|---|---|---|---|---|
| TW | 200729167 | | 1/2007 | |
| WO | 0001142 A1 | | 1/2000 | |
| WO | 0145395 A | | 6/2001 | |
| WO | 0178054 A1 | | 10/2001 | |
| WO | 2001078383 A2 | | 10/2001 | |
| WO | 02087243 A | | 10/2002 | |
| WO | 03043320 A2 | | 5/2003 | |
| WO | 2006119269 A2 | | 11/2006 | |
| WO | 2006127211 A2 | | 11/2006 | |
| WO | WO 2006119269 A2 * | | 11/2006 | G06F 3/048 |
| WO | 2007015047 A2 | | 2/2007 | |
| WO | 2008013350 A2 | | 1/2008 | |

OTHER PUBLICATIONS

USPTO "Final Office Action" mailed Dec. 7, 2011; U.S. Appl. No. 12/241,599, filed Sep. 30, 2008.

International Searching Authority, European Patent Office, "International Search Report," mailed Dec. 7, 2009; International Application No. PCT/US2009/058457, filed Sep. 25, 2009.

International Searching Authority, European Patent Office, "International Search Report and Written Opinion," mailed Dec. 18, 2009; International Application No. PCT/US2009/058456, filed Sep. 25, 2009.

International Searching Authority, European Patent Office, "International Search Report and Written Opinion," mailed Dec. 21, 2009; International Application No. PCT/US2009/058454 filed Sep. 25, 2009.

Anonymous "ZigBee," Wikipedia, the Free Encyclopedia [online], Sep. 26, 2008, XP002558439; retrieved from the Internet: <URL:http://en.wikipedia.org/w/index.php?title=ZigBee&oldid=241085798>[retrieved on Dec. 2. 2009].

Nintendo, "Wii Operations Manual System Setup,"2007.

Wikipedia, the free encyclopedia, "Dashboard (Software," Retrieved from the Internet on Oct. 6, 2008, http://en.wikipedia.org/w/index.php?title=Dashboard_(software)&printable=yes.

International Searching Authority, European Patent Office, "International Search Report," mailed Jan. 20, 2010; International Application No. PCT/US2009/057825 filed Sep. 22, 2009.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

VanDuyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. App. No. 12/241,580, filed Sep. 30, 2008.

(56) References Cited

OTHER PUBLICATIONS

Martch, Henry Gregg "Systems and Methods for Automatic Configuration of a Remote Control Device," U.S. Appl. No. 12/242,089, filed Sep. 30, 2008.
White, James Matthew et al. "Systems and Methods for Graphical Control of User Interface Features in a Television Receiver," U.S. Appl. No. 12/241,599, filed Sep. 30, 2008.
Coburn, Matthew et al. "Systems and Methods for Graphical Control of Symbol-Based Features in a Television Receiver," U.S. Appl. No. 12/241,604, filed Sep. 30, 2008.
White, James Matthew et al. "Systems and Methods for Graphical Adjustment of An Electronic Program Guide," U.S. Appl. No. 12/241,608, filed Sep. 30, 2008.
VanDuyn, Luke et al. "Methods and Apparatus for Presenting Supplemental Information in an Electronic Programming Guide," U.S. Appl. No. 12/235,476, filed Sep. 22, 2008.
VanDuyn, Luke et al. "Methods and Apparatus for Providing Multiple Channel Recall on a Television Receiver," U.S. Appl. No. 12/242,587, filed Sep. 30, 2008.
Taxier, Karen Michelle et al. "Methods and Apparatus for Visually Displaying Recording Timer Information," U.S. Appl. No. 12/235,464, filed Sep. 22, 2008.
Martch, Henry Gregg et al. "Methods and Apparatus for Locating Content in an Electronic Programming Guide," U.S. Appl. No. 12/242,614, filed Oct. 17, 2008.
Taxier, Karen Michelle et al. "Apparatus and Methods for Dynamic Pictorial Image Authentication," U.S. Appl. No. 12/236,430, filed Sep. 23, 2008.
USPTO "Final Office Action" mailed Jan. 20, 2012; U.S. Appl. No. 12/241,604, filed Sep. 30, 2008.
USPTO "Non-Final Office Action" mailed Nov. 24, 2010; U.S. Appl. No. 12/242,587, filed Sep. 30, 2008.
USPTO "Non-Final Office Action" mailed Jan. 12, 2011: U.S. Appl. No. 12/241,580, filed Sep. 30, 2008.
USPTO "Non-Final Office Action" mailed Jan. 28, 2011; U.S. Appl. No. 12/236,430, filed Sep. 23, 2008.
USPTO "Non-Final office Action" mailed Feb. 4, 2011; U.S. Appl. No. 12/241,599, filed Sep. 30, 2008.
USPTO "Non-Final Office Action" mailed Feb. 9, 2011; U.S. Appl. No. 12/241,608, filed Sep. 30, 2008.
International Searching Authority, European Patent Office, "International Search Report," mailed Feb. 4, 2010; International Application No. PCT/US2009/058937, filed Sep. 30, 2009.
International Searching Authority, European Patent Office, "International Search Report," mailed Feb. 16, 2010; International Application No. PCT/US2009/057582, filed Sep. 18, 2009.
Wightman, Robert Edward "Methods and Apparatus for Providing Multiple Channel Recall on a Television Receiver," U.S. Patent Appl. No. 12/233,274, filed Sep. 18, 2008.
USPTO "Non-Final Office Action" mailed Dec. 21, 2010; U.S. Appl. No. 12/235,476, filed Sep. 22, 2008.
USPTO "Non-Final Office Action" mailed Mar. 31, 2011; U.S. Appl. No. 12/241,556, filed Sep. 30, 2008.
USPTO "Non-Final Office Action" mailed Mar. 7, 2012; U.S. Appl. No. 12/235,464, filed Sep. 22, 2008.
USPTO "Non-Final Office Action" mailed Mar. 22, 2012; U.S. Appl. No. 12/241,556, filed Sep. 8, 2008.
USPTO "Non-Final Office Action" mailed Apr. 17, 2012; U.S. Appl. No. 12/241,608, filed Sep. 30, 2008.
USPTO"Non-Final Office Action" mailed Apr. 17, 2012; U.S. Appl. No. 12/241,608, filed Sep. 30, 2008.
The International Bureau of WIPO "International Preliminary Report on Patentability" mailed Apr. 14, 2011; International Appln. No. PCT/US2009/058236, filed Sep. 24, 2009.
USPTO "Final Office Action" mailed May 13, 2011; U.S. Appl. No. 12/242,587, filed Sep. 30, 2008.
European Patent Office, International Searching Authority, "International Search Report" mailed Nov. 10, 2009; International Appln. No. PCT/EP2009/061499.

USPTO "Non-Final Office Action" mailed Jan. 31, 2011; U.S. Appl. No. 12/233,274, filed Sep. 18, 2008.
USPTO "Final Office Action" mailed Apr. 25, 2012; U.S. Appl. No. 12/242,614, filed Sep. 30, 2008.
USPTO "Non-Final Office Action" mailed Apr. 24, 2012; U.S. Appl. No. 12/235,476, filed Sep. 22, 2008.
USPTO "Non-Final Office Action" mailed Jul. 6, 2011; U.S. Appl. No. 12/241,571, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed Jun. 23, 2011; U.S. Appl. No. 12/241,580, filed Sep. 30, 2008.
USPTO "Final Office Action" mailed May 13, 2011; U.S. Appl. No. 12/235,476, filed Sep. 22, 2008.
USPTO "Final Office Action" mailed Jul. 28, 2011; U.S. Appl. No. 12/241,608, filed Sep. 30, 2008.
USPTO "Final Office Action" mailed Aug. 18, 2011; U.S. Appl. No. 12/233,274, filed Sep. 18, 2008.
United States Patent and Trademark Office, Final Office Action for Patent U.S. Appl. No. 12/241,599, dated Aug. 26, 2011.
USPTO "Final Office Action" mailed Oct. 21, 2011; U.S. Appl. No. 12/241,571, filed Sep. 30, 2008.
USPTO "Final Office Action" mailed Oct. 5, 2011; U.S. Appl. No. 12/241,556, filed Sep. 30, 2008.
USPTO "Non-Final Office Action" mailed Nov. 23, 2011; U.S. Appl. No. 12/242,614, filed Sep. 30, 2008.
USPTO "Final Office Action" mailed Aug. 8, 2012 for U.S. Appl. No. 12/241,556, filed Sep. 30, 2008.
USPTO "Non-Final Office Action" mailed Jun. 28, 2012 for U.S. Appl. No. 12/241,571, filed Sep. 30, 2008.
USPTO "Final Office Action" mailed Aug. 9, 2012 for U.S. Appl. No. 12/235,476, filed Sep. 22, 2008.
USPTO "Final Office Action" mailed Aug. 2, 2012 for U.S. Appl. No. 12/241,599, filed Sep. 30, 2008.
USPTO "Final Office Action" mailed Jul. 17, 2012 for U.S. Appl. No. 12/241,580, filed Sep. 30, 2008.
USPTO "Final Office Action" mailed Aug. 1, 2012 for U.S. Appl. No. 12/241,608, filed Sep. 30, 2008.
United States Patent and Trademark Office, Office Action for U.S. Appl. No. 12/242,587, dated Jun. 5, 2012.
USPTO "Final Office Action" mailed Oct. 9, 2012 for U.S. Appl. No. 12/235,464, filed Sep. 22, 2008.
USPTO "Final Office Action" mailed Sep. 14, 2012 for U.S. Appl. No. 12/242,587, filed Sep. 30, 2008.
Intellectual Property Office "Office Action" issued Oct. 25, 2012 for Taiwan Patent Appln. No. 098127906.
Intellectual Property Office "Office Action" issued Oct. 30 2012 for Taiwan Patent Appln. No. 098127902.
USPTO "Notice of Allowance" mailed Nov. 6, 2012 for U.S. Appl. No. 12/241,599, filed Sep. 30, 2008.
USPTO "Final Office Action" mailed Nov. 13, 2012 for U.S. Appl. No. 12/24,571, filed Sep. 30, 2008.
USPTO "Non-Final Office Action" mailed Nov. 15, 2012 for U.S. Appl. No. 12/241,608, filed Sep. 30, 2008.
USPTO "Non-Final Office Action" mailed Dec. 5, 2012 for U.S. Appl. No. 12/24,556, filed Sep. 30, 2008.
USPTO "Final Office Action" mailed Jan. 23, 2013 for U.S. Appl. No. 12/241,604, filed Sep. 30, 2008.
USPTO "Non-Final Office Action" mailed Feb. 12, 2013 for U.S. Appl. No. 12/235,476, filed Sep. 22, 2008.
USPTO, "Office Action" mailed Sep. 11, 2013 for U.S. Appl. No. 12/241,556.
USPTO, "Notice of Allowance and Fee(s) Due" mailed Sep. 13, 2013 for U.S. Appl. No. 12/235,464.
USPTO, "Office Action" mailed Sep. 17, 2013 for U.S. Appl. No. 12/242,587.
USPTO, "Final Office Action" mailed Dec. 4, 2013 for U.S. Appl. No. 12/241,604.
USPTO, "Final Office Action" mailed Jun. 7, 2013 for U.S. Appl. No. 12/241,556.
USPTO, "Office Action" mailed Aug. 9, 2013 for U.S. Appl. No. 12/241,580.

(56) References Cited

OTHER PUBLICATIONS

USPTO, "Notice of Allowance and Fee(s) Due" mailed Aug. 14, 2013 for U.S. Appl. No. 12/235,476.
USPTO, "Office Action" mailed Aug. 19, 2013 for U.S. Appl. No. 12/241,604.
USPTO, "Notice of Allowance and Fee(s) Due" mailed May 7, 2013 for U.S. Appl. No. 12/241,608, filed Sep. 30, 2008.
U.S. Patent and Trademark Office, Final Office Action, mailed Apr. 23, 2014 for U.S. Appl. No. 12/241,556.

* cited by examiner

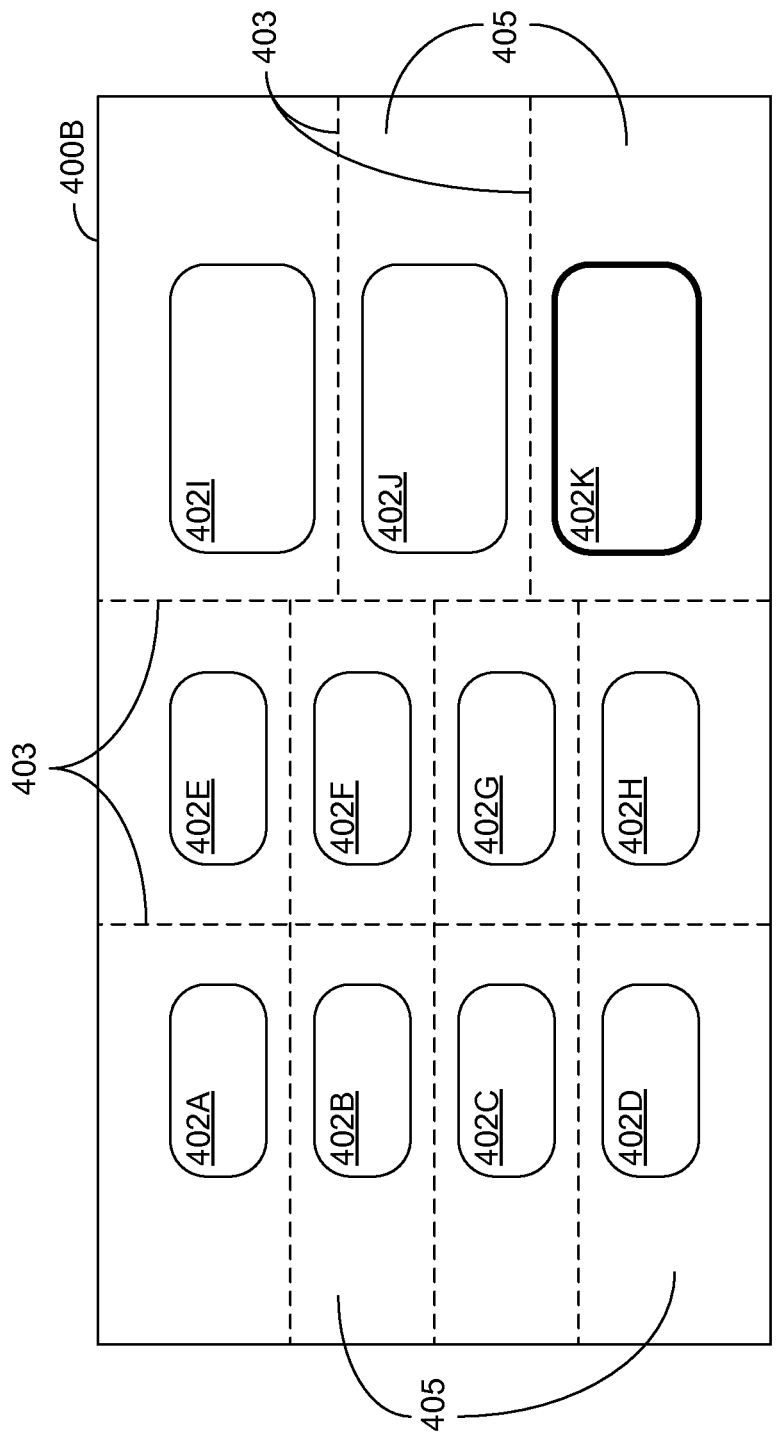

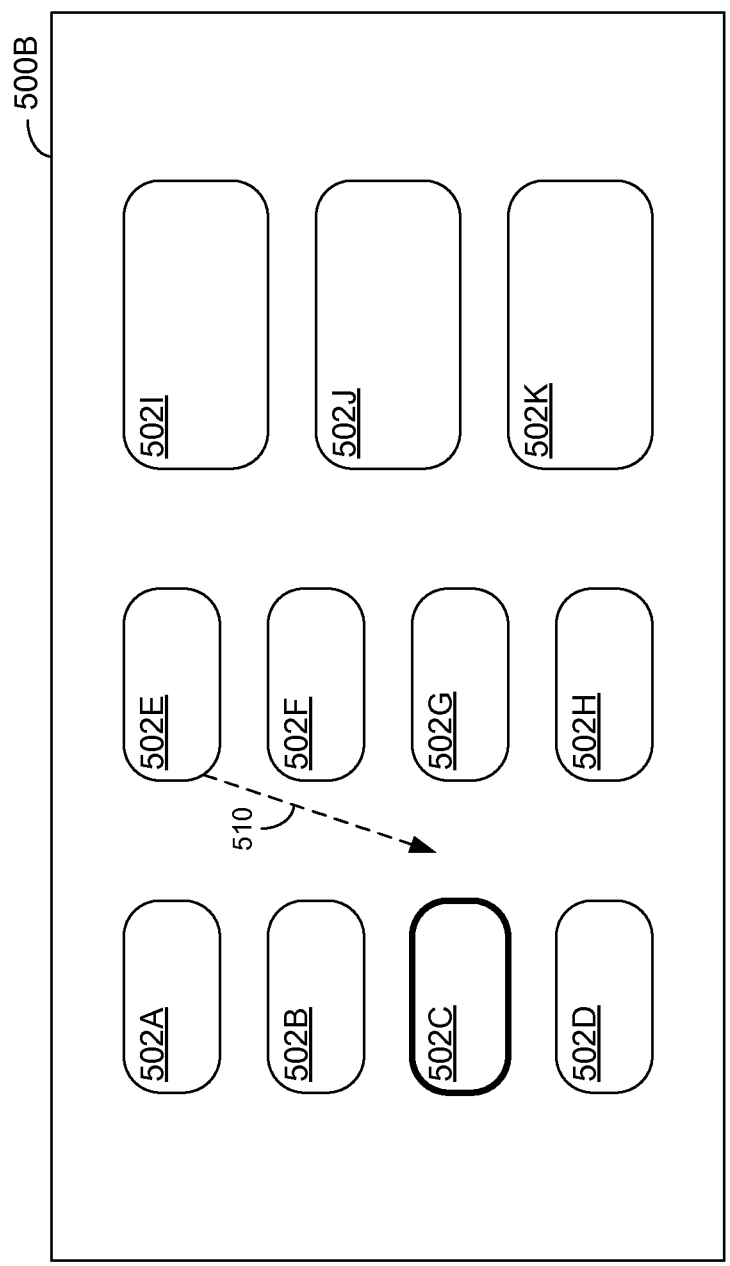

GRAPHICAL INTERFACE NAVIGATION BASED ON IMAGE ELEMENT PROXIMITY

RELATED APPLICATIONS

This application claims the benefit of U.S. Provisional Application No. 61/110,233, entitled "GRAPHICAL INTERFACE NAVIGATION BASED ON IMAGE ELEMENT PROXIMITY", and filed Oct. 31, 2008, which is hereby incorporated herein by reference in its entirety.

BACKGROUND

To facilitate user operation, most home entertainment components, such as cable, terrestrial, and satellite set-top boxes, provide a remote control device to allow a user to operate the associated component from a distance, such as from a couch or chair. Other audio/video devices, such as televisions, audio receivers, digital video disc (DVD) players, video cassette recorders (VCRs), and the like, also typically provide a remote control device. Normally, a remote control device provides a number of labeled buttons or keys, in which each label, such as "channel +", "channel −", "volume +", and "volume −", describes the particular device operation or input selection to be initiated when the user presses the associated key. Thus, in some cases, the user merely looks at the remote control itself, and presses the appropriate key for the desired input.

However, many of these components may also provide a menu system presented on a television or other visual display to allow a user to initiate more complex operations, such as recording timer settings, internal clock setup, and the like. To navigate such a menu, the remote control device associated with the component typically provides a set of directional (e.g., "up", "down", "left", and "right") keys that facilitate the highlighting of a different one of a number of image elements of the displayed menu with each key press. Further, a selection key associated with the directional keys typically allows the user to select the currently highlight image element as a user input operation for the component.

Outside the realm of audio/video entertainment devices, desktop computers typically employ a computer "mouse" to allow a user to manipulate a cursor atop a graphical user interface (GUI) to select one or more graphical items, launch applications, choose a browser link, and facilitate many other computer-related activities. Laptop computer users often rely on a touchpad, small joystick, or similar device for user input; albeit with less accurate results than are normally associated with a mouse, due in part to the necessarily small physical dimensions of most input devices incorporated in laptop computers.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIGS. 4A, 4B, 4C, and 4D are graphical representations of images associated with a graphical user interface according to an embodiment of the invention that employs a position indicator.

FIGS. 5A and 5B are graphical representations of images associated with a graphical user interface according to an embodiment of the invention that does not employ a position indicator.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
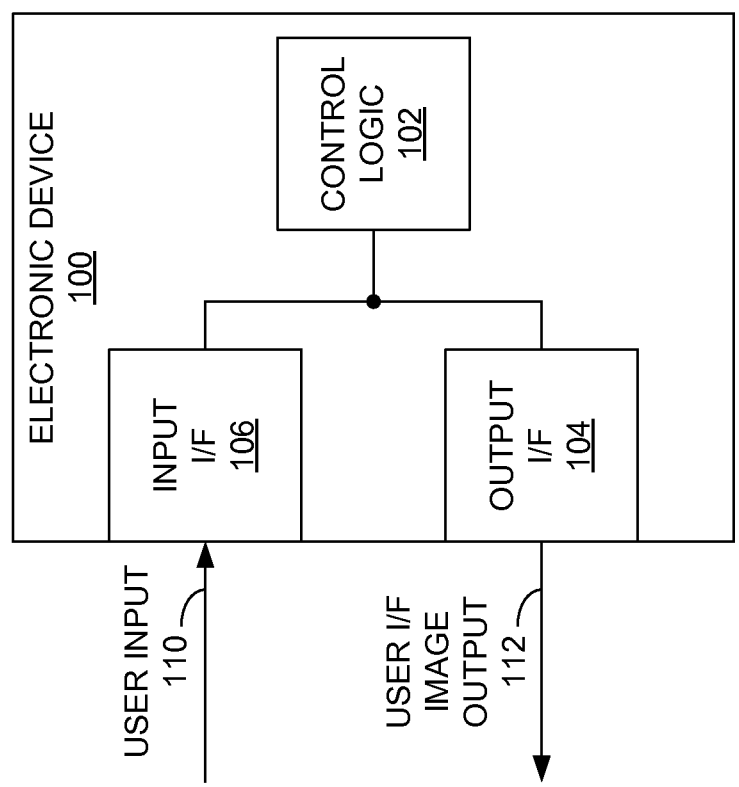
FIG. 1 is a block diagram of an electronic device incorporating graphical user interface navigation according to an embodiment of the invention.

FIG. 1 is a block diagram of an electronic device 100 according to an embodiment of the invention in which a graphical user interface is provided to allow the user to control the electronic device 100. In some embodiments, the electronic device 100 may be an audio/video entertainment device, such as a set-top box adapted to receive radio and/or television signals by way of satellite, cable, or terrestrial ("over-the-air") transmission. Other such audio/video devices may include, but are not limited to, televisions or video monitors, audio/video receivers, digital video recorders (DVRs), video cassette recorders (VCRs), digital video disc (DVD) players, and gaming systems. Further, other electronic devices aside from audio/video devices, such as computers, personal digital assistants (PDAs), communication devices, and the like incorporating a graphical user interface may serve as the electronic device 100 of FIG. 1.

The electronic device 100 includes control logic 102, an output interface 104, and an input interface 106. The control logic 102 may be any circuitry or system configured to perform the various operations discussed below. For example, the control logic 102 may be one or more processors, such as a microprocessor, microcontroller, or digital signal processor (DSP), configured to execute instructions directing the processor to perform the functions discussed in detail below. In another implementation, the control logic 102 may be hardware-based logic, or may include a combination of hardware, firmware, and/or software elements.

Generally, the output interface 104 of the electronic device 100 is configured to present an image associated with a graphical user interface of the electronic device 100 to a user. In one embodiment, the output interface 104 is a video output, such as a modulated, composite, or component video output, for connection to a television or video monitor (not shown in FIG. 1) to display the image to the user. In another implementation, the output interface 104 incorporates a visual display or monitor therein.

The input interface 106 is configured to receive one or more user inputs related to the graphical user interface of the electronic device 100. For example, the input interface 106 may be a wired or wireless communication interface configured to receive the user input by way of a remote control device (not shown in FIG. 1) or other device configured to transmit user input, such as device 100 commands, to the input interface 106. In another implementation, the input interface 106 includes means, such as buttons, keys, and other human interface structures, for allowing a user to enter input directly into the input interface 106.

Figure 2:
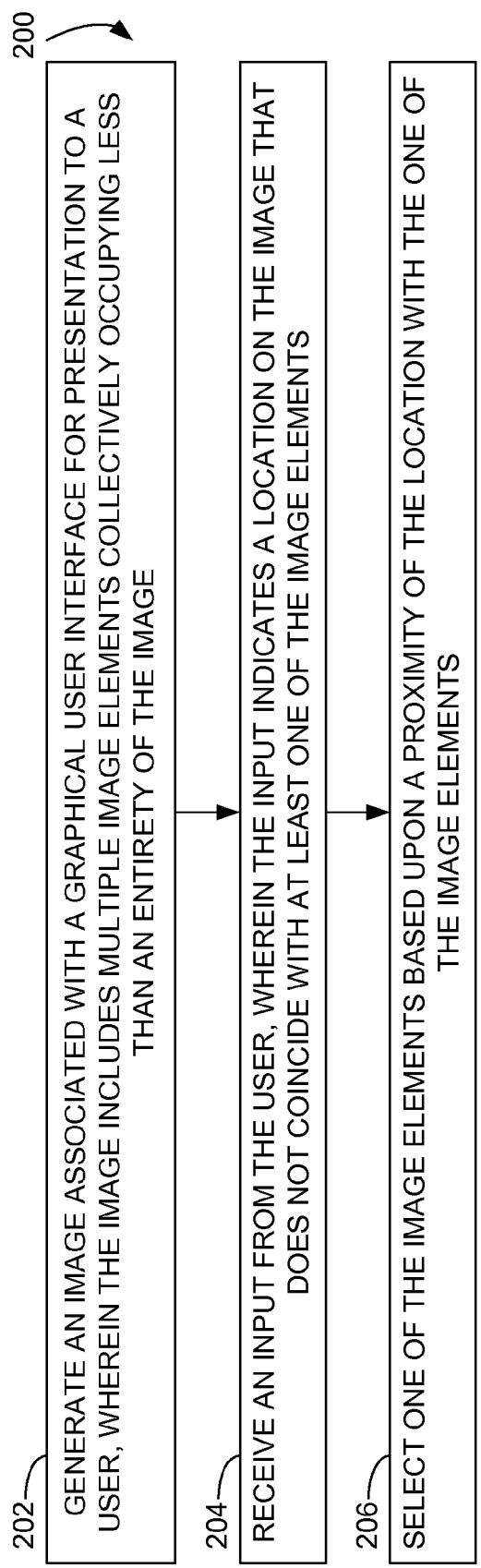
FIG. 2 is a flow diagram of a method according to an embodiment of the invention of facilitating navigation of a graphical user interface.

FIG. 2 is a flow diagram describing a method 200 according to an embodiment of the invention for navigating the graphical user interface of the electronic device 100 of FIG. 1. However, other devices employing a graphical user interface other than the electronic device 100 shown in FIG. 1 may serve as the physical platform for executing the various operations of the method 200 in other embodiments.

In the method 200 of FIG. 2, the control logic 102 generates an image 112 associated with the graphical user interface for presentation to a user by way of the output interface 104 (operation 202). The image 112 includes multiple image elements, each of which may be identified with some user input operation associated with the graphical user interface. The input interface 106 receives an input 110 from the user indicating a location on the image 112 (operation 204). Presuming the location does not coincide with at least one of the image elements, one of the image elements is selected based upon the proximity of the location with the one of the image elements (operation 206). While FIG. 2 indicates a specific order of execution of the operations 202-206, other possible orders of execution, including concurrent execution of one or more operations, may be undertaken in other implementations. In another embodiment, a computer-readable storage medium may have encoded thereon instructions for a processor or other control logic, such as the control logic 102 of FIG. 1, to direct a device to implement the method 200.

Thus, as a result of the method 200, the user may be allowed to indicate an image element to provide input to the electronic device 100 without precisely or accurately selecting that specific image element by way of the input interface 106. Such capability may be desirable in situations in which one or more of the image elements is difficult to select or specify by way of the particular user input interface 106 employed for the electronic device 100.

Figure 3:
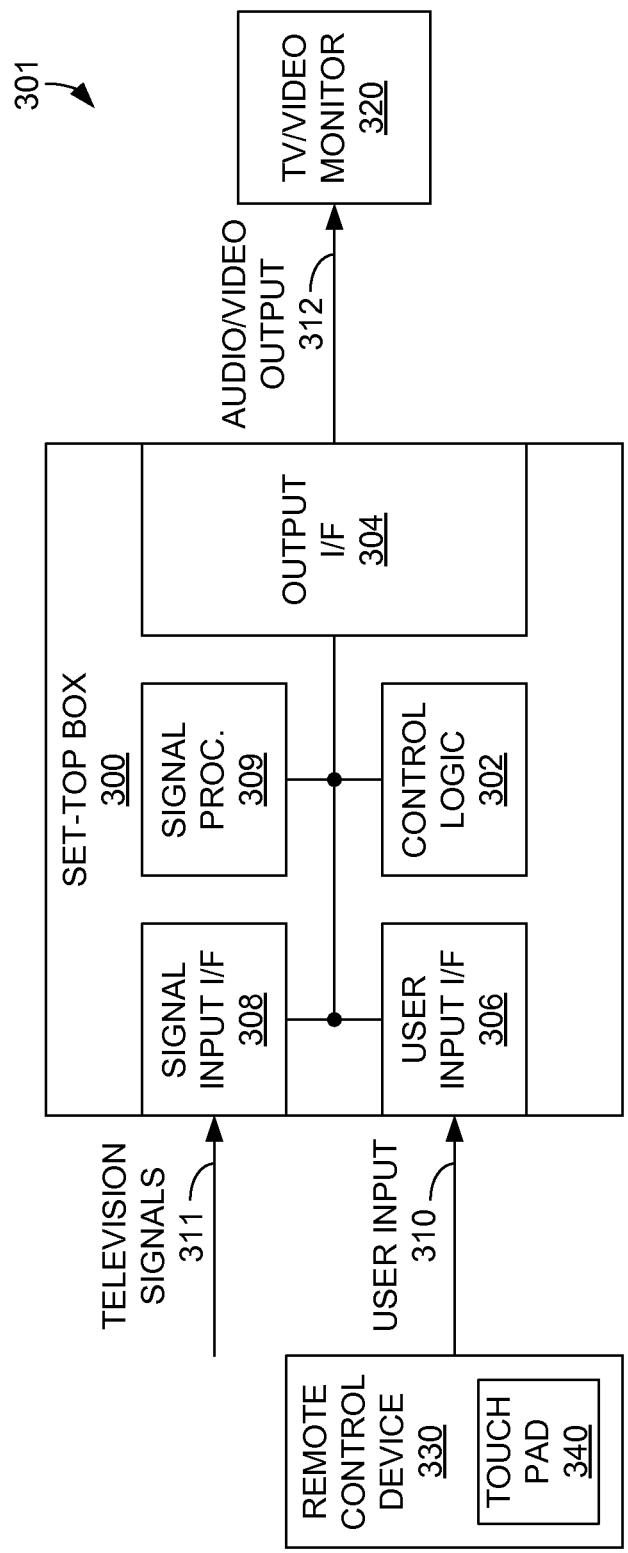
FIG. 3 is a block diagram of a set-top box incorporating graphical user interface navigation according to an embodiment of the invention.

FIG. 3 provides a particular example of an electronic device incorporating a graphical user interface as described herein: a set-top box 300. The set-top box 300 includes control logic 302, an output interface 304, a user input interface 306, a signal input interface 308, and a signal processor 309. The set-top box 300 may be a television set-top box for satellite, cable, and/or terrestrial television signal reception. Other components, such as a DVR, smart card interface, and the like, may also be incorporated into the set-top box 300, but are neither shown in FIG. 3 nor discussed herein to simplify and facilitate the discussion presented below.

As with the control logic 102 of FIG. 1, the control logic 302 of FIG. 3 of may include any control circuitry capable of performing the various operations of the control logic 302 described below, as well as controlling the other components of the set-top box 300 set forth above. The control logic 302 may include one or more processors, such as a microprocessor, microcontroller, or DSP, configured to execute instructions directing the processor to perform the functions described hereinafter. In another implementation, the control logic 302 may be hardware-based logic, or may include a combination of hardware, firmware, and/or software elements.

The user input interface 306 of FIG. 3 is configured to receive user input from a user, such as by way of a remote control device 330 being operated or manipulated by the user. As a result, the user input interface 306 may receive any wired or wireless signals, such as infrared (IR) or radio frequency (RF) signals, carrying the user input. The user input interface 306 may receive and process other types of user input signals emanating from a remote control device 330, such as acoustic or optical signals, in other embodiments. Further, the user input interface 306 may also include a control panel or similar construct that allows the user to provide input more directly to the set-top box 300.

The signal input interface 308 is configured to receive television signals 311. The television signals 311 may conform to any of several formats, thus dictating in part the specific configuration of the interface 308. For example, in the case the television signals 311 are transmitted to the set-top box 300 via satellite, a paraboloid antenna coupled with a low-noise block converter feedhorn (LNBF) (not shown in FIG. 3) may capture and down-convert the frequencies of the satellite signals before passing these signals to the signal input interface 308, typically by way of coaxial cable. If the television signals 311 are cable signals, the signal input interface 308 typically receives the signals 308 by way of coaxial cable from a cable head-end or distribution facility. In another example, the television signals 311 are terrestrial signals which the signal input interface 308 may receive by way of an over-the-air antenna (not shown in FIG. 3). In each case, the signal input interface 308 transfers the received signals to the signal processor 309 of the set-top box 300.

The signal processor 309 may include any of a number of components functionally adapted to process the received television signals 311 for ultimate transfer to the output interface 304. In one example, the signal processor 309 includes at least one tuner (not shown in FIG. 3) to select one or more of the received television signals 311 associated with a particular programming channel. Other processing conducted within the signal processor 309 may include demodulation, demultiplexing, decryption, and decoding of the television signals 311.

Once processed, the signal processor 309 transfers the signals 311 to the output interface 304, which outputs the audio/video output 312 resulting from the processing of the television signals 311 to an output device, such as the television ro video monitor 320 depicted in FIG. 3. The output interface 304 may provide the audio/video output 312 in a number of formats, including, but not limited to, modulated RF output, composite video output, component video output, and output conforming to the High-Definition Multimedia Interface (HDMI).

The user may control various aspects of the signal processor 309, such as which of the television signals 311 to view, the audio volume of the selected television signal 311, and so on, by way of the remote control device 330 and the user input interface 306 in conjunction with visual information provided to the user by way of the output interface 304 and the television 320. Other functions, such as general set-top box parameter modification, timer recording, electronic program guide (EPG) presentation, and the like, may also be controlled in such a manner. To that end, the control logic 302 generates an image associated with the graphical user interface. The user then manipulates the remote control device 300 to enter user input to the control logic 302 while the control logic 302 provides visual feedback regarding that input to the user by way of the generated image. The user input may include any user-initiated operation, such as volume changes, channel changes, and the like.

Figure 4A:
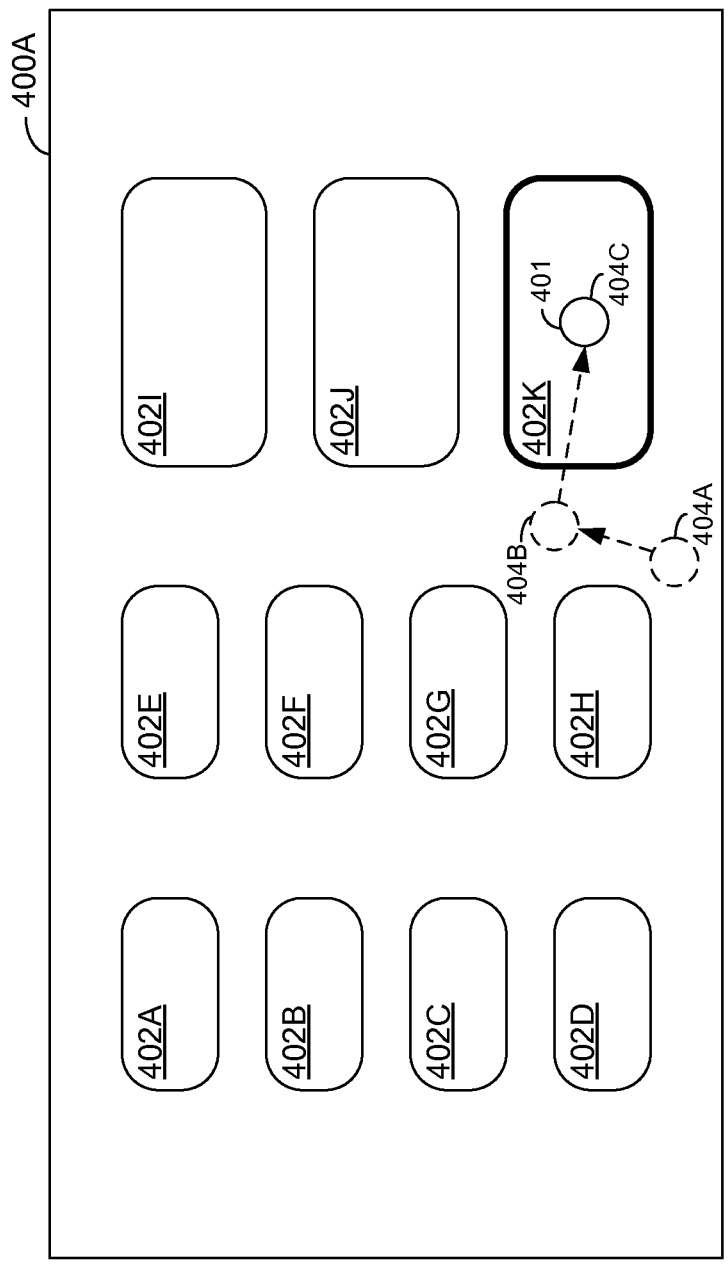

Another aspect of the user input is navigation of a menu or similar input selection means provided by the control logic 302, as represented by the image generated thereby. FIG. 4A provides a simplistic example of an image 400A providing a number of image elements 402A-404K. In this particular example, each of the image elements 402 appears as a virtual button or similar structure to be selected by the user as user input. Each of the image elements 402 may correspond to a data entry item, a menu selection item, or any other type of input data. In response to selecting one of the image elements 402, the control logic 302 of the set-top box 300 may react in a number of ways. First, the control logic 302 may initiate a particular function associated with the selected image element 504. In another example, the control logic 302 may wait until the user selects one or more additional image elements 402 via the remote control device 330. Alternatively, the control logic 302 may generate another image incorporating a different set of image elements for presentation to the user in response to the most recent user input operation. Other possible responses by the control logic 302 are also possible.

To allow the user to select one or more of the image elements 402 of the image 400A, the control logic 302, by way of the remote control device 330 and the user input 310, provides a mechanism by which the user may navigate about the image. Previous systems, such as set-top boxes, DVD players, and the like, provide an image with a number of separate elements, with one of the elements being highlighted or otherwise emphasized for user selection by way of a selection key, as mentioned above. The user may then employ a set of directional keys, as described above, to allow the user to transfer the highlighting from one image element to another by each successive key press. However, the directional keys typically indicate movement only in the vertical or horizontal direction.

In the embodiments discussed herein, the remote control devices 330 may incorporate a more versatile input means, such as a touchpad 340, joystick or similar input device, to allow the user more freedom in designating a location within the image 400A to select one or more of the various image elements 402 therein. However, given that such input means must generally be small (e.g., approximately two inches across) to be incorporated within the remote control device 330, accurate navigation across a comparatively large image 400A with a significant number of image elements 402 may prove difficult. Such difficulty may be further compounded by the fact that the image elements 402, when taken collectively, often do not cover the entire image 400A (as shown in FIG. 4A), thus allowing the possibility of user navigation into areas of the image 400A not associated with a particular image element 402.

To facilitate the use of such an input means, the control logic 302 may be configured to allow more inaccurate or imprecise user input to navigate the image 400A successfully. To that end, the control logic 302 is configured to receive a user input 310 from the remote control device 330 by way of the user input interface 306 in which the input indicates a location within the image 400A that does not coincide with at least one of the image elements 402. In response, the control logic 302 selects one of the image elements 402 based at least on the proximity of the location with the selected image element 402.

FIG. 4A graphically depicts an example of the image 400A discussed above, in which a location 404 of interest is denoted by way of a location indicator 401, such as a cursor. Presuming an initial location 404A of the indicator 401, the user may employ the touchpad 340, joystick, or similar means of the remote control device 330 to "push" the indicator 401 in a substantially upwardly vertical direction toward a second location 404B not specifically coinciding with any of the image elements 402. For example, the user may drag a fingertip or stylus across the touchpad 340 in an upward direction, or push a joystick in the corresponding direction, to provide the one or more user inputs 310 received by the control logic 302 through the user input interface 306 to effect the movement of the indicator 401. In response to the movement indicated by the user, the control logic 302 selects the image element 402K, which is closest in proximity to the second location 404B.

In one example, the control logic 302 makes its selection at the end of the path from 404A to 404B, such as when the user stops pushing the indicator 401 upward. This event may occur when the user releases a joystick being used to move indicator 401, or if the user stops movement over, or ceases contact with, the touchpad 340. In another example, the control logic 302 makes its selection when movement of the indicator 401 falls below some predetermined speed.

In one implementation, the selected image element 402 is highlighted in the image 400A to indicate the selection to the user. FIG. 4A shows such highlighting as a thickened border for the selected image element 402K. Other methods of displaying the selected image element 402K, such as changing the color of the element 402K, or flashing the element 402K, may be employed in other embodiments.

In another example, the control logic 302 may also cause the location indicator 401 to be positioned on or within the selected image element 402K, such as at a third location 404C illustrated in FIG. 4A. While FIG. 4A depicts the third location 404C as being centered on the selected image element 402K, other positions, such as on an edge closest to the second position 404B indicated by the user, may serve as the third location 404C in other implementations.

While the control logic 302 determines the selected image element 402K based on the proximity of the location 404B, the control logic 302 may employ other factors in addition to, or in lieu of, the proximity of the indicated location 404B to the various image elements 402 in other implementations. In one embodiment, the control logic 302 may also select a particular image element 402 based on its size or total area within the image 400. For example, in the case of FIG. 4A, if the position indicator 401 is located equidistant from two or more image elements 402, such as second position 404B between elements 402H and 402K, the larger element 402K may be selected over the smaller element 402H. In another example, the smaller element 402H may be selected over the larger element 402K. In this latter case, the smaller element 402H may warrant such an advantage based on the theory that the smaller element 402H may be more difficult to select due to its size compared to the larger element 402K.

According to another implementation, the control logic 302 may base its selection on a user input selection associated with each of the various image elements 402. For example, an image element 402 associated with an often-used interface selection, such as a program search menu selection, or a request to display the EPG, may be weighted higher in the selection of an image element over a less-used input selection, such as a display of the latest set-top box 300 software revision number. Other factors in ranking the various image elements by user input selection, such as by their ultimate effect on the set-top box 300, may also be utilized. In one example, those image elements 402 related to deleting television programs currently stored within the set-top box 300 may be ranked lower than other operations to prevent unintended data deletion.

In one implementation, one or more of the factors discussed above may be embodied by way of a boundary 403 defining an area 405 surrounding each image element 402, as shown in an image 400B of FIG. 4B. Typically, the boundaries 403 are not explicitly displayed on the image 400A, but are employed by the control logic 302 to determine which of the image elements 402 are selected. For example, when a user causes a position indicator to be placed within an area 405 associated with a particular image element 402, the control logic 302 may select the associated image element 402, as described above. Further, the size, shape, and extent of each area 405 may be tailored to take into account the various factors discussed herein, including but not limited to proximity, size, and user input selection function. In the particular example of FIG. 4B, the areas 405 within the various boundaries 403 encompass the entire image 400B, but such complete coverage of the image 400B is not required.

Figure 4C:
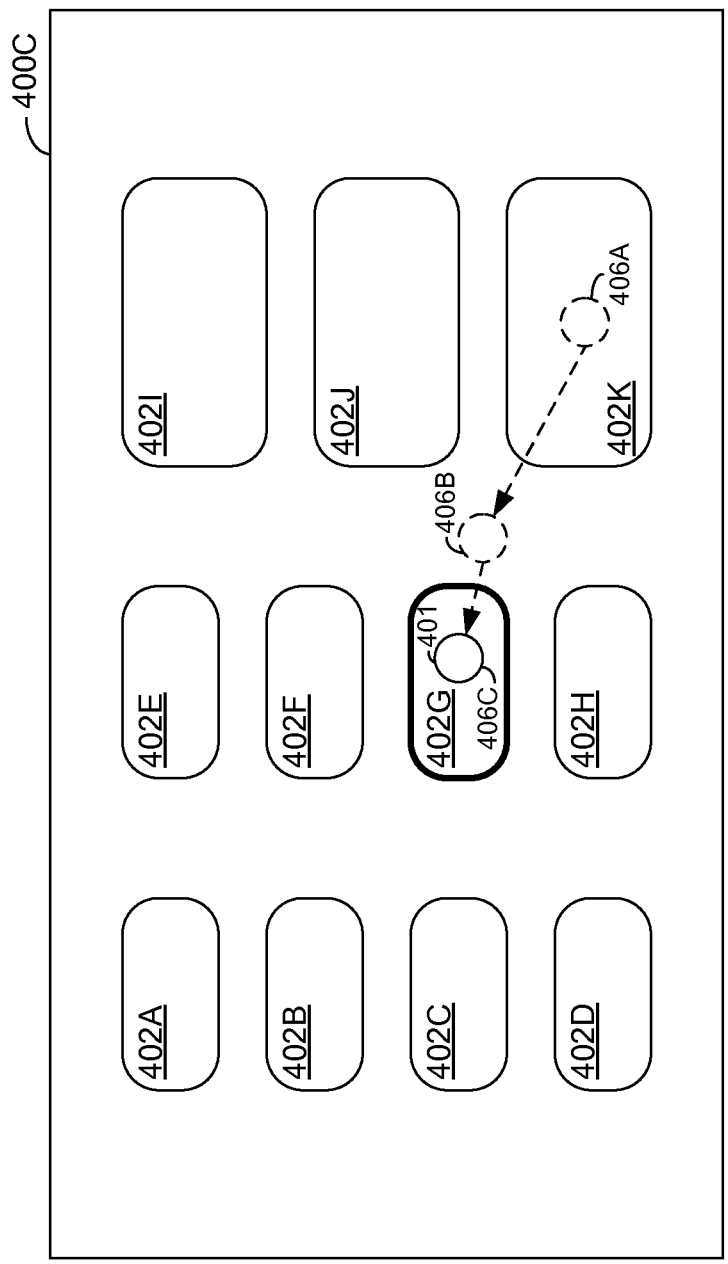

Other factors potentially considered by the control logic 302 in selecting an image element 402 may be direction and/or speed at which the user urges the position indicator 401 across the image. FIG. 4C illustrates a particular case in which the user uses the touchpad 340 of the remote control device 330 to direct the position indicator 401 from a position 406A in the image element 402K a short distance toward the upper-left corner of the image 400C, stopping at a second position 406B. In this situation, the control logic 302 may interpret the movement of the indicator 401 as an attempt to move the cursor to the next image element 402G indicated by the direction of the path designated by the first position 406A and the second position 406B. Thus, as a result, the control logic 302 may select the element 402G, indicating that fact via the image 400C by highlighting the selected element 402G. In addition, the control logic 302 may also place the position indicator 401 within or adjacent to the selected element 406G, as described earlier.

Figure 4D:
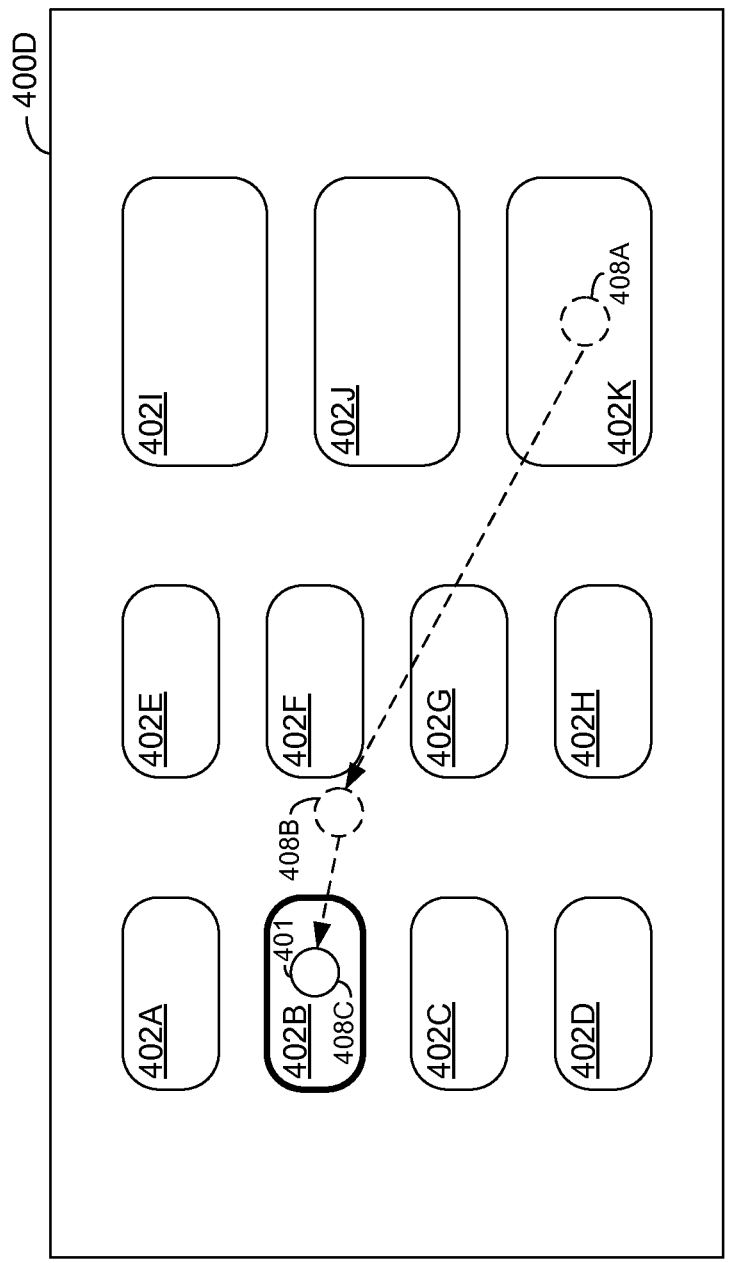

In another example illustrated in FIG. 4D, presuming essentially the same starting position within the image element 402K, designated in FIG. 4D as 408A, the user indicates via the remote control device 330 a movement of the position indicator 401 in the same general direction as that shown in FIG. 4C, but instead passing over the image element 402G, ending in a second location 408B just beyond the element 402G. Under these circumstances, the control logic 302 may presume that the user intended to move the indicator 401 further toward the image element 402B along the left end of the image 400D. Accordingly, the control logic 302 may select the image element 402B as that intended by the user, and also highlight the element 402 and/or place the indicator 401 within or adjacent to the element 402B, as shown in FIG. 4D.

In another implementation, the control logic 302 may also take into consideration the speed of the position indicator 401 along the path between the first position 406A and the second position 408B. For example, if the movement of the indicator 401, as determined by the user in manipulating the touchpad 340 of the remote control device 330, attains some predetermined speed, the control logic 302 may select the image element 402B, as illustrated in FIG. 4D. If, instead, the speed of the indicator 401 remains below the predetermined speed, the control logic 302 may determine that the closer image element 402G crossed by the indicator 401 was the intended target of the movement, and select that element 402G as a result.

In the examples discussed above, the control logic 302 may include one or more of these factors (e.g., element 402 proximity, element 402 size, an input selection associated with the element 402, and the direction and/or speed of the indicator 401) in the selection of the image element 402 as indicated by the indicator 401 movement caused by the user. Depending on the implementation, the control logic 302 may value or weigh one or more of these factors in combination in any manner desired. As a result, the control logic 302 may define a kind of logical "gravity" associated with each of the image elements 402 of the image 400, thus providing a framework within which inaccurate positioning of the indicator 401 outside any of the image elements 402 may still result in a reasonable selection of an image element 402 most likely intended by the user.

In one implementation, the control logic 302, after selecting the image element 402 according to concepts described above, may enter a user input selection associated with the selected image element 402 as the selected input of the user. For example, if the selected image element 402 is associated with an operation to display the EPG on the television 320, the control logic 302 may display the EPG on the television 320 by way of the output interface 304 without any further input from the user. In another arrangement, after the control logic 302 selects the image element 402, and highlights that selection for the user, the user may verify the selection by issuing another input by way of the remote control device 330 to enter the user input selection associated with the selected image element 402. For example, the user may press a selection key, tap the touchpad 340, or perform some other manipulation of the remote control device 300 to enter the selection and, thus, initiate the operation associated with the selected image element 402.

Figure 5A:
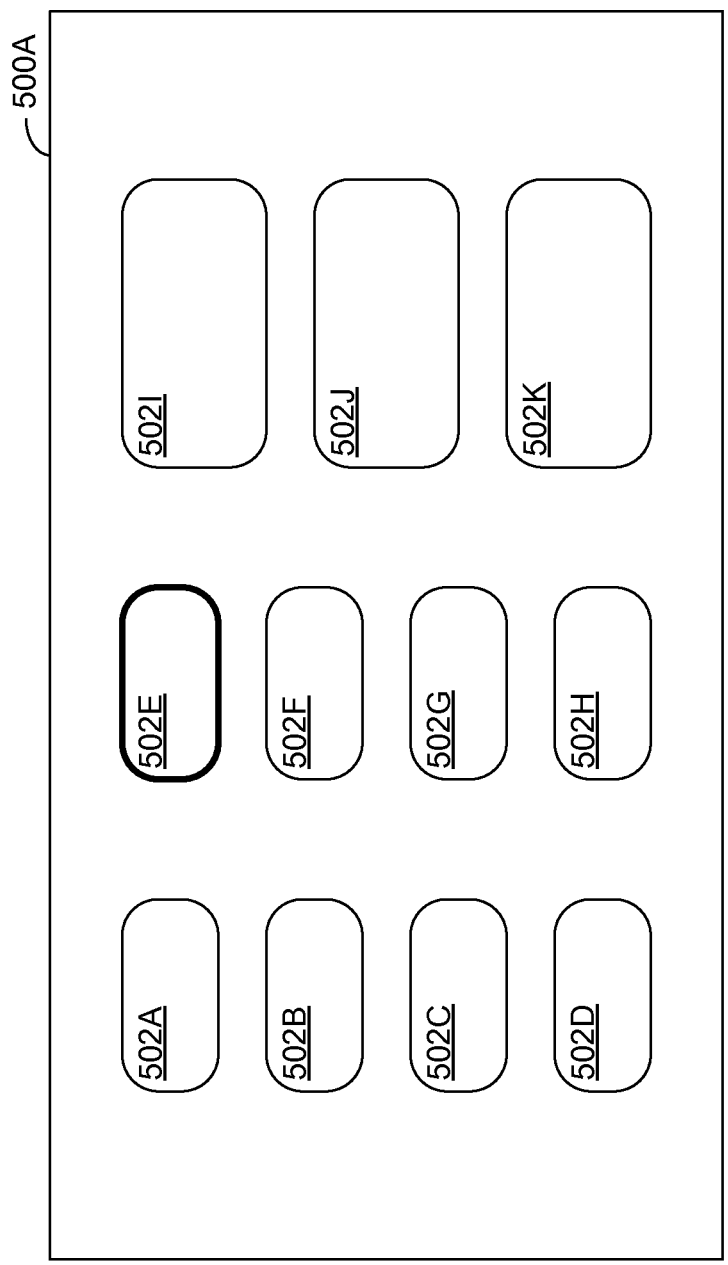

All of the embodiments discussed above in FIGS. 4A-4D employ the use of a position indicator 401 to guide the user in manipulating the touchpad 340, joystick, or other user input device in a selection of the image element 402 as a user input selection. However, in other implementations, the use of an explicit position indicator 401 may not be necessary. For example, as shown an image 500A in FIG. 5A, a starting point for any movement indicated by the user via the remote control device 330 may be denoted by one of the image elements 502A-502K of the image 500A. In the particular example of FIG. 5A, the starting position is denoted by the highlighted image element 502E. The highlighted image element 502E may have been selected as a result of a previous user input 310, or the control logic 302 may have pre-selected the image element 502E as the initial position to be employed by the user.

Presuming in this case that the user wishes to select another image element 502 in the image 500A, the user may manipulate the touchpad 340 integrated within the remote control device 330 as described above to define a path 510 indicated in FIG. 5B. In this case, the path is illustrated in FIG. 5B merely as a visual indication of the path indicated by the user; the path 510 would not actually be presented to the user in the image 500B.

In response to user inputs 310 describing the path 510, the control logic 302 may select the image element 502C according to any of the factors (proximity of the image elements 502 to the path 510, size of the image elements 502, the user input selections associated with the various image elements 502, the direction and/or speed described by the path 510, and so on) presented above. Further, the control logic 302 may highlight or otherwise indicate the selected image element 502C in the image presented to the user by way of the output interface 304 and the television or video monitor 520, as illustrated in FIG. 5B. By doing so, the control logic 302 maintains the capability of informing the user of a reference point (i.e., the selected image element 502C) from which the user may navigate to another portion of the image 500B by using the remote control device 330.

At least some embodiments as described herein for navigating a graphical user interface may provide a number of benefits. In general, by allowing the use of an input device, such as a touchpad or joystick, that provides a user the ability to navigate across an image provided by the interface in directions other than vertical and horizontal, the resulting user interface may be less tedious and more intuitive to use than other interface systems. Further, systems and methods as described above may allow the user to be less accurate or precise in their use of a remote control device or other user input interface while retaining the ability to select a desired image element of a graphical interface. Such capability may be beneficial in environments in which the user input device does not lend itself to accurate positioning of a graphical indicator or precise selection of image elements.

While several embodiments of the invention have been discussed herein, other implementations encompassed by the scope of the invention are possible. For example, while various embodiments have been described primarily within the context of satellite, cable, and terrestrial television set-top boxes, any other device incorporating a graphical user interface, including televisions, DVD players, DVRs, VCRs, DVD players, and gaming systems, as well as computers, PDAs, and the like, may benefit from application of the various concepts described herein. Further, while emphasis has been placed on the use of touchpads, joysticks, and similar two-dimensional input devices, other devices allowing inputs related to three-dimensional graphics, such as the Nintendo Wii™ gaming controller, may be implemented to provide advantages similar to those expressed above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of facilitating navigation of a graphical user interface, the method comprising:
    generating a palette menu associated with the graphical user interface for presentation to a user, wherein the palette menu comprises button elements, and wherein each of the button elements resides within a boundary such that the plurality of button boundaries encompass substantially the entirety of the menu palette, and wherein the button elements collectively occupy less than an entirety of the palette menu, and wherein at least one of the button elements resides within a boundary of the plurality of boundaries, the boundary describing an area associated with the one of the button elements that is larger than the one of the button elements;
    receiving an input from a remote control, from the user, wherein the input indicates a location on the palette menu and traverses a path within the palette menu, and wherein the location does not coincide with the one of the button elements, and for each of the button elements assigning a weight to the size of the one of the button elements, a direction described by the path relative to the button element, and a speed described by the path to form a weighted combination; and
    selecting the one of the button elements based on the weighted combination for that button and on the received input from the user, wherein if the selection of the one of the button elements results in the deletion of television programs, decreasing a ranking of the weighted combination of the one of the button elements.

2. The method of claim 1, further comprising:
    indicating the selected one of the button elements on the palette menu.

3. The method of claim 1, wherein:
    selecting the one of the button elements is further based upon a user input selection associated with the one of the button elements.

4. The method of claim 1, further comprising:
    indicating the location on the palette menu.

5. The method of claim 1, wherein:
    the palette menu comprises one of a two-dimensional image and a three-dimensional image.

6. The method of claim 1, wherein:
    an end of the path comprises the location.

7. The method of claim 1, further comprising:
    entering a user input selection associated with the selected one of the button elements.

8. The method of claim 1, further comprising:
    receiving a second input from the user; and
    in response to the second input, entering a user input selection associated with the selected one of the button elements.

9. The method of claim 1, wherein:
    each of the button elements is associated with a corresponding user interface operation for an audio/video device.

10. The method of claim 9, wherein:
    the audio/video device comprises one of a satellite television receiver, a cable television receiver, a terrestrial television receiver, an audio receiver, a digital video disc player, a video cassette recorder, a digital video recorder, a television gaming system, and a television.

11. The method of claim 9, wherein:
    the input from the user is received by way of a remote control device associated with the audio/video device.

12. The method of claim 9, wherein:
    at least one of the button elements is associated with a function provided by the audio/video device.

13. A method of facilitating navigation of a graphical user interface for a satellite television receiver, the method comprising:
    generating a palette menu associated with the graphical user interface for presentation to a user by way of a video output of the satellite television receiver, wherein the palette menu comprises button elements, wherein each of the button elements resides within a boundary such that the plurality of button boundaries encompass substantially the entirety of the menu palette, and wherein the button elements collectively occupy less than an entirety of the palette menu, and wherein each of the button elements is associated with a user input selection for the satellite television receiver, and wherein at least one of the button elements resides within a boundary of the plurality of boundaries, the boundary describing an area associated with the one of the button elements that is larger than the one of the button elements;
    receiving an input from a remote control, from the user by way of a remote control device associated with the satellite television receiver, wherein the input indicates a location on the palette menu, and traverses a path within the palette menu and wherein the location does not coincide with the one of the button elements, and for each of the button elements assigning a weight to the size of the button elements, a direction described by the path relative to the button element, and a speed described by the path to form a weighted combination;

selecting the one of the button elements based on the weighted combination for the respective button element and on the received input, wherein if the selection of the one of the button elements results in the deletion of television programs, decreasing a ranking of the weighted combination of the one of the button elements; and indicating the selected one of the image elements on the image.

14. An electronic device, comprising:

control logic configured to generate a palette menu associated with a graphical user interface of the electronic device, wherein the palette menu comprises button elements, wherein each of the button elements resides within a boundary such that the plurality of button boundaries encompass substantially the entirety of the menu palette, and wherein the button elements collectively occupy less than an entirety of the palette menu, and wherein each of the button elements denotes a user input selection associated with the graphical user interface, and wherein at least one of the button elements resides within a boundary of the plurality of boundaries, the boundary describing an area associated with the one of the button elements that is larger than the one of the button elements;

an output interface configured to present the palette menu to the user; and a user input interface configured to receive an input from a remote control operated by a user, wherein the input indicates a location on the palette menu, and traverses a path in the palette menu and wherein the location does not coincide with the one of the button elements;

wherein the control logic is configured to assign a weighted combination for each of the image elements, the weighted combination including the size of the button element, a direction described by the path relative to the button element, and a speed described by the path, wherein the control logic is further configured to select the one of the button elements based on the weighted combination for the one of the button elements and on the received input, wherein if the selection of the one of the button elements results in the deletion of television programs, decreasing a ranking of the weighted combination of the one of the button elements.

15. The electronic device of claim 14, wherein:
the output interface is configured to present the palette menu to the user by way of a video display.

16. The electronic device of claim 14, wherein:
the user input interface is configured to receive the input from a remote control device operated by the user.

17. The electronic device of claim 16, wherein:
the remote control device comprises at least one of a touchpad and a joystick configured to be manipulated by the user to enter the input.

18. The electronic device of claim 14, further comprising:
a signal input interface configured to receive television signals;
a signal processor configured to process the received television signals and transfer the received television signals to the output interface for presentation to the user;
wherein the control logic is configured to control operation of the signal processor based at least in part on the selected one of the button elements.

* * * * *